United States Patent
Alshehri et al.

(10) Patent No.: US 9,624,114 B1
(45) Date of Patent: Apr. 18, 2017

(54) METHOD FOR PREPARING ADSORBENT FOR REMOVING ORGANIC POLLUTANTS FROM WATER

(71) Applicant: KING SAUD UNIVERSITY, Riyadh (SA)

(72) Inventors: Saad M. Alshehri, Riyadh (SA); Tansir Ahamad, Riyadh (SA); Mu Naushad, Riyadh (SA); Jahangeer Ahmed, Riyadh (SA); Zeid A. Al-Othman, Riyadh (SA)

(73) Assignee: KING SAUD UNIVERSITY, Riyadh (SA)

(*) Notice: Subject to any disclaimer, the term of this patent is extended or adjusted under 35 U.S.C. 154(b) by 0 days.

(21) Appl. No.: 15/364,221

(22) Filed: Nov. 29, 2016

(51) Int. Cl.
| | |
|---|---|
| C02F 1/28 | (2006.01) |
| B01J 20/22 | (2006.01) |
| B01J 20/28 | (2006.01) |
| C02F 101/34 | (2006.01) |
| C02F 101/38 | (2006.01) |

(52) U.S. Cl.
CPC ............... C02F 1/286 (2013.01); B01J 20/22 (2013.01); B01J 20/28061 (2013.01); C02F 2101/345 (2013.01); C02F 2101/38 (2013.01)

(58) Field of Classification Search
None
See application file for complete search history.

(56) References Cited

U.S. PATENT DOCUMENTS

| 6,090,292 A * | 7/2000 | Zimmermann | ...... C07K 14/765 210/500.24 |
| 7,906,149 B2 * | 3/2011 | Yarborough | ......... A61K 9/0014 424/520 |

FOREIGN PATENT DOCUMENTS

CN 101829545 A 9/2010

OTHER PUBLICATIONS

Mondal et al., "Eggshell Powder as an Adsorbent for Removal of Fluoride from Aqueous Solution: Equilibrium, Kinetic and Thermodynamic Studies," E-Journal of Chemistry, 2012, 9(3) 1457-1480.

* cited by examiner

Primary Examiner — Chester Barry
(74) Attorney, Agent, or Firm — Richard C. Litman

(57) ABSTRACT

A method for preparing an adsorbent for removing organic dyes from water includes reacting egg white with hydrochloric acid. The reaction can include mixing egg white with water to form a solution, and adding the acid to the solution to form a precipitate. The precipitate can be filtered, washed, and dried to provide the adsorbent. The adsorbent can be contacted with wastewater contaminated with organic pollutants to remove the organic pollutants from the wastewater. The organic pollutants can include p-nitrophenol.

11 Claims, 4 Drawing Sheets

METHOD FOR PREPARING ADSORBENT FOR REMOVING ORGANIC POLLUTANTS FROM WATER

BACKGROUND OF THE INVENTION

1. Field of the Invention

The present invention relates generally to adsorbents, and particularly, to a method of preparing an adsorbent for removing organic pollutants from wastewater.

2. Description of the Related Art

Due to rapid industrialization and urbanization of many societies, various organic molecules are discharged into the natural environment and cause many serious environmental problems. Among these organic molecules, p-nitrophenol is one of the most toxic pollutants. In recent years, p-nitrophenol has become a great concern because of its increased discharge and adverse effects on receiving water bodies. It is known that p-nitrophenol is bio-accumulative, persistent, and highly toxic even at very low concentrations. The exposure to p-nitrophenol can cause anemia, eye and skin irritation, liver and kidney damage, cancer, and systemic poisoning. The United States Environmental Protection Agency (USEPA) has listed nitrophenols as "Priority Pollutants," and regulated their concentrations in natural waters to be about <10 ng $L^{-1}$. Due to the environmental hazard, p-nitrophenol must be removed from the aqueous environment. Therefore, fast and effective removal of p-nitrophenol from industrial wastewater and nature water is becoming more and more urgent.

A number of methods have been used to address nitrophenol contamination in water, including photodegradation, adsorption, electro-coagulation, microbial degradation and electro-Fenton method. Among these methods, adsorption on solid adsorbents is a technique that offers many advantages. For example, adsorption techniques are low in cost, simple in design and operation, and insensitive to toxic substances. Recent developments in environmental technology have involved sustainable materials and advanced management practices for waste materials such as production of value added products from waste materials. As a result, many industries are seeking advanced materials to remove organic pollutants form wastewater.

Thus, a method for preparing removing organic pollutants such as p-nitrophenol from wastewater using natural adsorbent thereby solving the aforementioned problems is desired.

SUMMARY OF THE INVENTION

A method for preparing an adsorbent for removing organic dyes from water includes reacting egg white with an acid to provide a self-condensation polymerization reaction in which albumin in the egg white is cross-linked and water is released as a by-product. The reaction can include mixing egg white with water to form a solution, and adding the acid to the solution to form a precipitate. The precipitate can be dried to form the adsorbent.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
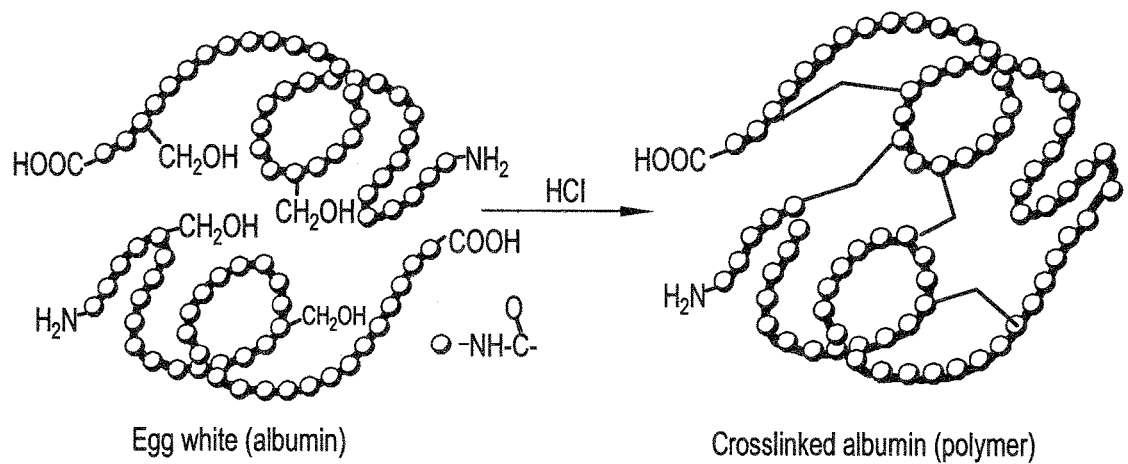
FIG. 1 shows an exemplary procedure to prepare the adsorbent according to the present invention.

A method for preparing an adsorbent for removing organic dyes from water includes reacting egg white with an acid. The reaction can include mixing egg white with water to form a solution, and adding the acid to the solution to form a white precipitate. The precipitate can be filtered, washed, and dried to provide the adsorbent. The precipitate is black after drying. The adsorbent is a mesoporous powder. The surface area of the adsorbent can be about 185.8 $m^2/g$. The acid can be hydrochloric acid. The acid can be added dropwise to the solution under vigorous stirring. The mixture can be stirred for about two hours at room temperature. After washing, the precipitate can be dried under vacuum at 75° C. for about 24 hours. After drying, the precipitate is black.

The adsorbent can be contacted with an aqueous solution, e.g., a body of water or wastewater, contaminated with organic pollutants using batch adsorption to remove the organic pollutants therefrom. The aqueous solution can have a neutral pH, e.g., pH 7. The adsorbent can then be isolated by filtration. The adsorbent can have an adsorptive capacity of about 50 mg/g to about 60 mg/g. For example, the adsorption capacity of the adsorbent can be about 59.6 mg/g.

The organic pollutants can include p-nitrophenol. The adsorbent can adsorb p-nitrophenol from the aqueous solution in less than one minute after contacting the contaminated water. A concentration of the p-nitrophenol in the aqueous solution can be monitored at about 317 nm using a spectrophotometer. The adsorption step can be carried out at room temperature at a pH of about 7. An optimum concentration of the adsorbent can be about 25 mg/25 ml. The adsorbent can efficiently remove p-nitrophenol from aqueous solution and can be advantageously employed in controlling environmental pollution. The adsorbent is biocompatible, ecofriendly, and removes the p-nitrophenol (>99.5%) from aqueous solution in a short amount of time, e.g., less than one minute.

After the adsorbent has been used to remove the p-nitrophenol, the adsorbent can be regenerated or recycled for reuse by placing the adsorbent in contact with a regenerating solution, such as methanol. The regenerating solution separates the adsorbent from the adsorbed organic pollutants, e.g., p-nitrophenol. The adsorbent can be reused for five consecutive cycles with a loss of only 4.1% in the adsorption percentage after five cycles.

As defined herein, "egg white" refers to the white, protective gelatinous substance surrounding the yolk of a bird's egg, e.g., a chicken's egg. The egg white includes mainly albumin. The egg white albumin includes several amide groups which can react with the hydrochloric acid in a self-condensation polymerization reaction in which albumin in the egg white is cross-linked and water is released as a by-product. Accordingly, the adsorbent is a cross-linked egg-white based resin.

The following examples will further illustrate the process for removing organic pollutants from wastewater.

EXAMPLE 1

Preparation of the Adsorbent

The adsorbent was prepared by homogenously mixing 20 ml fresh albumin and 10 ml double ionized (DI) water (albumin:DI water v/v ratio of 2:1) under rapid stirring for 30 minutes at room temperature to form an albumin solution. Then, 5 ml of concentrated HCl was added dropwise to the albumin solution under vigorous stirring on a magnetic stirrer at room temperature for 2 hours. The resulting white precipitate was filtered off, washed with distilled water and dried under vacuum at 75° C. for 24 hours.

FIG. 1 depicts the reaction scheme for synthesis of the adsorbent for removing organic pollutants from wastewater. In the reaction, albumin from the egg white reacts with concentrated hydrochloric acid (HCl), which cross-links the amino acids of the albumin (via self-condensation polymerization), forming the cross-linked polymeric resin and releasing water as a by-product.

Figure 2:
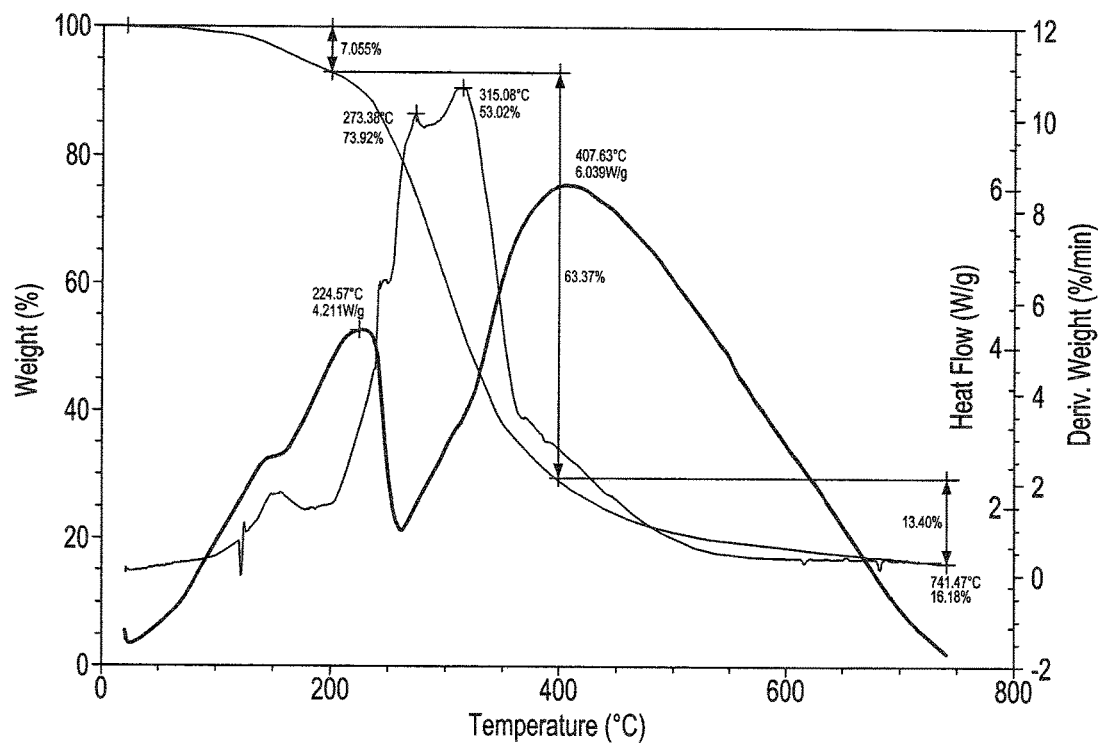
FIG. 2 shows the FTIR spectra of the adsorbent according to the present invention.
Figure 3:
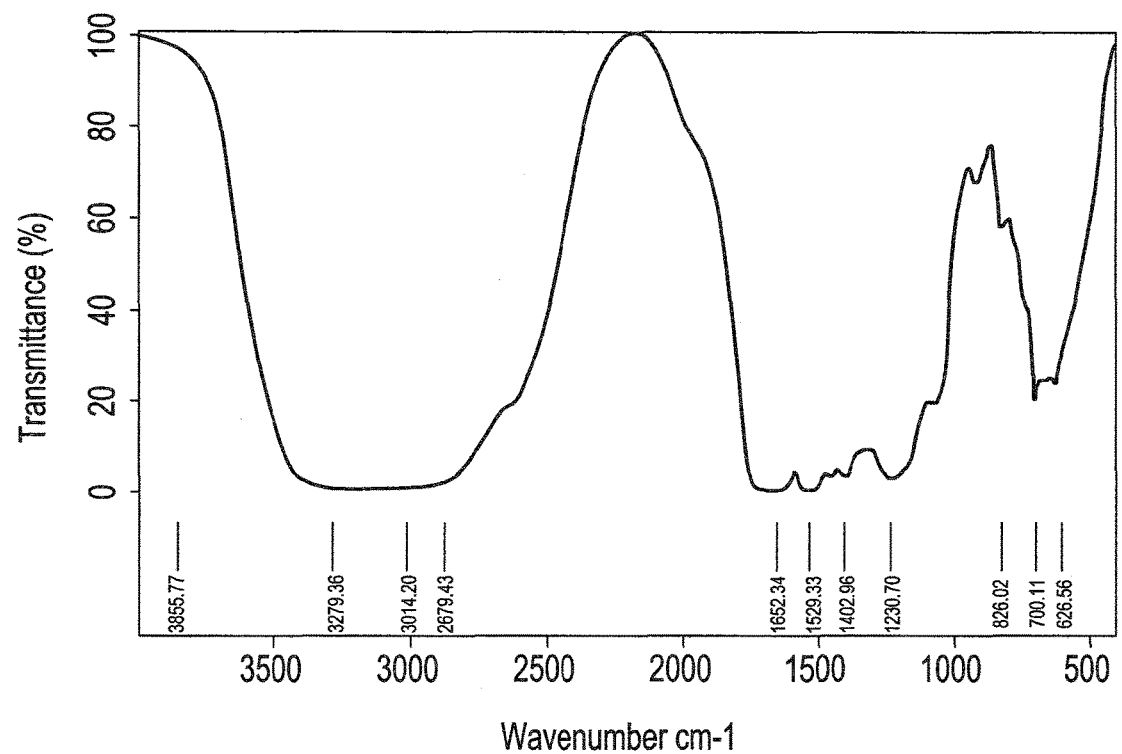
FIG. 3 shows thermogravimetric analysis and differential scanning calorimetry thermogram (TGA/DTA/DSC) according to the present invention.

FIG. 2 shows the Fourier Transform Infra-Red (FTIR) spectrum of the adsorbent. The FTIR results reveals that most of the FTIR bands are broad and support the intermolecular hydrogen bonding. FIG. 3 shows the thermogravimetric analysis and differential scanning calorimetry thermogram (TGA/DTA/DSC) of the adsorbent prepared according to Example 1. The natural adsorbent was decomposed in two stages. The first degradation stage was up to 200° C., due to the removal of moisture and adsorbed water. The second or main degradation stage was between 200° C.-500° C., and likely included degradation of the main organic components. The residue weight observed at 741° C. was 16.18%.

Figure 4:
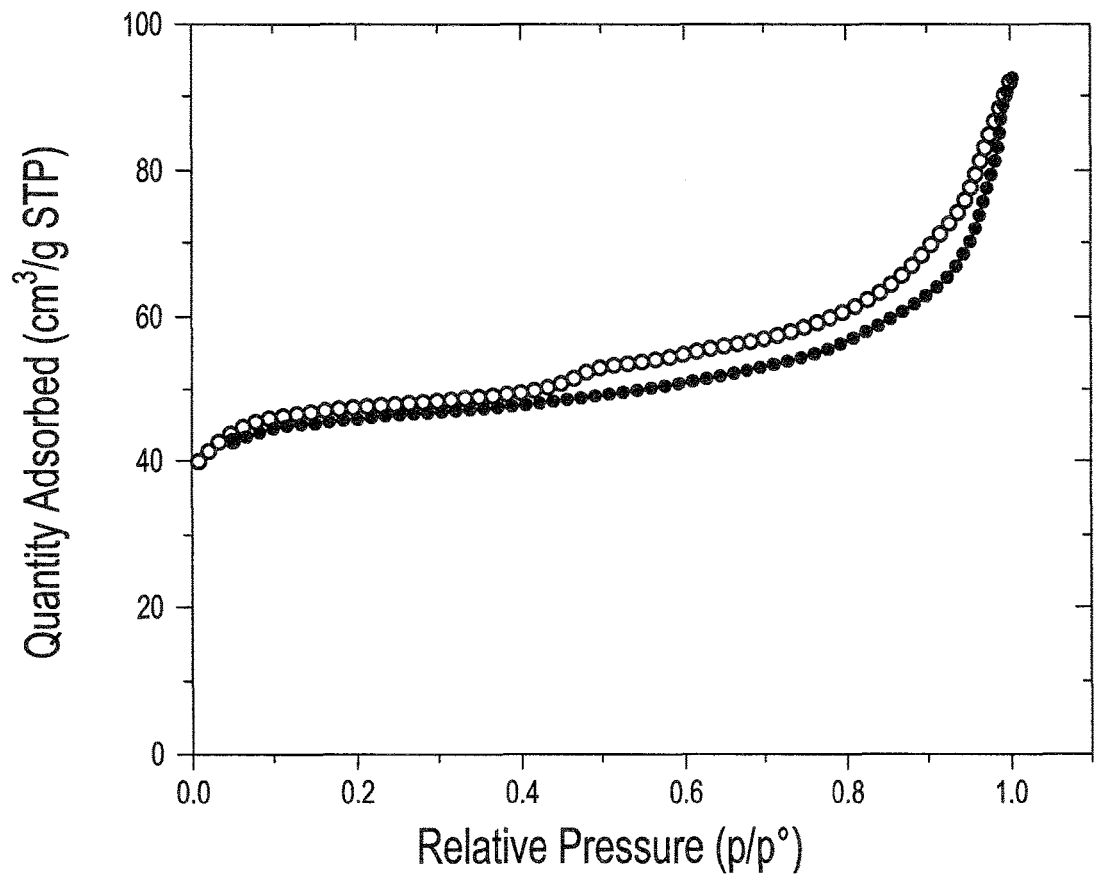
FIG. 4 shows the $N_2$ adsorption-desorption measurements to measure the porosity and surface nature of the adsorbent according to the present invention.

The porosity and surface nature of the adsorbent were measured. FIG. 4 shows the $N_2$ adsorption-desorption measurements for the adsorbent. The adsorption isotherms are type IV in the case of both nanoparticles. The Brunauer-Emmett-Teller (BET) surface area of the adsorbent was found to be 185.8 $m^2/g$.

EXAMPLE 2

Adsorption of p-Nitrophenol Using the Adsorbent

Batch adsorption experiments were conducted in a 250 mL conical flask by placing 25 mg of the adsorbent with 25 mL of a mixture of 300 ppm, p-nitrophenol at 25° C. The test flasks were sealed to prevent change in the volume of the solution during the experiments. The equilibrium study was performed by sampling at different time intervals (1-60 min) to achieve the equilibrium. After the adsorption process, the adsorbent was separated from the solution by filtration and the concentration of p-nitrophenol in the aqueous medium was determined by UV-vis spectrophotometer at $\lambda_{max}$ of 317 nm.

The amount of adsorbed p-nitrophenol Qe (mg/g) and the percent adsorption (%) of were computed using equation 1:

$$Q_e = V(C_0 - C_e)W \times 1000 \tag{1}$$

wherein, V is the volume of adsorbate solution in liters, $C_0$ and Ce are the initial and final concentrations (mg $L^{-1}$) of the adsorbate (p-nitrophenol) in solution and W is the weight in grams of the cross-linked egg-white based polymeric resin.

It is to be understood that the present invention is not limited to the embodiments described above, but encompasses any and all embodiments within the scope of the following claims.

We claim:

1. A method for preparing an adsorbent for removing organic pollutants from water, comprising the steps of:
    mixing egg white with water to form a solution;
    adding acid to the solution to form a white precipitate; and
    drying the white precipitate at about 75° C. for about 24 hours to provide a black precipitate, the black precipitate being the adsorbent.

2. The method for preparing an adsorbent for removing organic pollutants from water according to claim 1, wherein the organic pollutants include p-nitrophenol.

3. The method for preparing an adsorbent for removing organic pollutants from water according to claim 1, wherein a surface area of the adsorbent ranges from about 180 $m^2/g$ to about 190 $m^2/g$.

4. The method for preparing an adsorbent for removing organic pollutants from water according to claim 1, wherein the acid is hydrochloric acid.

5. The method for preparing an adsorbent for removing organic pollutants from water according to claim 1, wherein the adsorbent is a mesoporous powder.

6. An adsorbent for removing organic pollutants from water prepared according to the method of claim 1.

7. A method for removing organic pollutants from water, comprising the steps of:
    contacting the adsorbent of claim 6 with the water for a period of time sufficient to adsorb the organic pollutants.

8. The method for removing of organic pollutants from water according to claim 7, wherein the adsorption is carried out at room temperature at a neutral pH.

9. The method for removing organic pollutants from water according to claim 7, wherein an optimum concentration of the adsorbent in the water is about 25 mg/25 ml.

10. The method for removing organic pollutants from water according to claim 7, wherein the organic pollutants include p-nitrophenol.

11. The method for removing organic pollutants from water according to claim 7, wherein the period of time is one minute or less.

* * * * *